(12) United States Patent
Satpathy et al.

(10) Patent No.: US 12,745,065 B2
(45) Date of Patent: Sep. 22, 2026

(54) NETWORK SLICING COORDINATION OVER NEXT GENERATION RADIO ACCESS NETWORKS

(71) Applicant: Radisys Corporation, Hillsboro, OR (US)

(72) Inventors: Bhawani Sankar Satpathy, Dhenkanal (IN); Rajendra Prasad Kodaypak, Hillsboro, OR (US)

(73) Assignee: Radisys Corporation, Hillsboro, OR (US)

( * ) Notice: Subject to any disclaimer, the term of this patent is extended or adjusted under 35 U.S.C. 154(b) by 645 days.

(21) Appl. No.: 18/326,879

(22) Filed: May 31, 2023

(65) Prior Publication Data

US 2024/0406694 A1 Dec. 5, 2024

(51) Int. Cl.

| | |
|---|---|
| ***H04W 4/50*** | (2018.01) |
| ***H04W 48/18*** | (2009.01) |
| ***H04W 84/04*** | (2009.01) |

(52) U.S. Cl.

CPC ............ *H04W 4/50* (2018.02); *H04W 48/18* (2013.01); *H04W 84/042* (2013.01)

(58) Field of Classification Search

CPC ...... H04W 4/50; H04W 48/18; H04W 84/042
See application file for complete search history.

(56) References Cited

U.S. PATENT DOCUMENTS

| | | | | |
|---|---|---|---|---|
| 2018/0324663 | A1* | 11/2018 | Park | H04W 36/0083 |
| 2019/0306761 | A1* | 10/2019 | Jin | H04W 76/30 |
| 2021/0045048 | A1* | 2/2021 | Li | H04W 76/10 |
| 2021/0112616 | A1* | 4/2021 | Karandikar | H04W 76/16 |
| 2021/0144619 | A1* | 5/2021 | Prakash | H04W 48/08 |
| 2021/0352531 | A1* | 11/2021 | Vesely | H04W 76/19 |
| 2022/0210868 | A1* | 6/2022 | Park | H04W 28/0278 |
| 2023/0069349 | A1* | 3/2023 | Liu | H04W 48/18 |
| 2023/0131696 | A1* | 4/2023 | Choe | H04W 48/18 370/332 |
| 2024/0244484 | A1* | 7/2024 | Lunardi | H04W 24/10 |
| 2024/0357479 | A1* | 10/2024 | Bhaskaran | H04W 28/0289 |
| 2024/0397362 | A1* | 11/2024 | Yao | H04W 24/10 |
| 2025/0133462 | A1* | 4/2025 | Liu | H04W 36/13 |

* cited by examiner

*Primary Examiner* — Steven S Kelley
(74) *Attorney, Agent, or Firm* — Stoel Rives LLP

(57) ABSTRACT

A gNB-DU and a gNB-CU coordinate network slice information over an F1 interface by exchanging F1 setup request/response or gNB-DU configuration update/acknowledge messages indicating PLMNs and supported network slice information. In some embodiments, a UE provides its slice information that is checked at the gNB for support at an AMF. In response to determining that the UE network slice provisioning is unsupported, the gNB-DU triggers an RRC message including network slice information of neighboring cells.

14 Claims, 14 Drawing Sheets

RECEIVE A FIRST MESSAGE FROM THE GNB-DU OVER THE F1 INTERFACE, IN WHICH THE FIRST MESSAGE IS AN F1 SETUP REQUEST OR AN GNB-DU CONFIGURATION UPDATE, AND THE FIRST MESSAGE INDICATING A FIRST PLMN SET PROVISIONED AT THE GNB-DU WITH EACH PLMN OF THE FIRST PLMN SET HAVING A FIRST ASSOCIATED S-NSSAI SET 1202

COMPARE THE FIRST PLMN SET WITH A SECOND PLMN SET PROVISIONED AT THE GNB-CU, EACH PLMN OF THE SECOND PLMN SET HAVING A SECOND ASSOCIATED S-NSSAI SET, TO DETERMINE MATCHING NETWORK SLICE INFORMATION FOR ANY COMMON PLMNS AMONG THE FIRST AND SECOND PLMN SETS 1204

TRIGGER A SECOND MESSAGE FOR THE GNB-DU, IN WHICH THE SECOND MESSAGE IS AN F1 SETUP RESPONSE OR AN GNB-DU CONFIGURATION UPDATE ACKNOWLEDGE, AND IN WHICH THE SECOND MESSAGE INDICATES THE MATCHING NETWORK SLICE INFORMATION FOR THE COMMON PLMNS AMONG THE FIRST AND SECOND PLMN SETS 1206

200

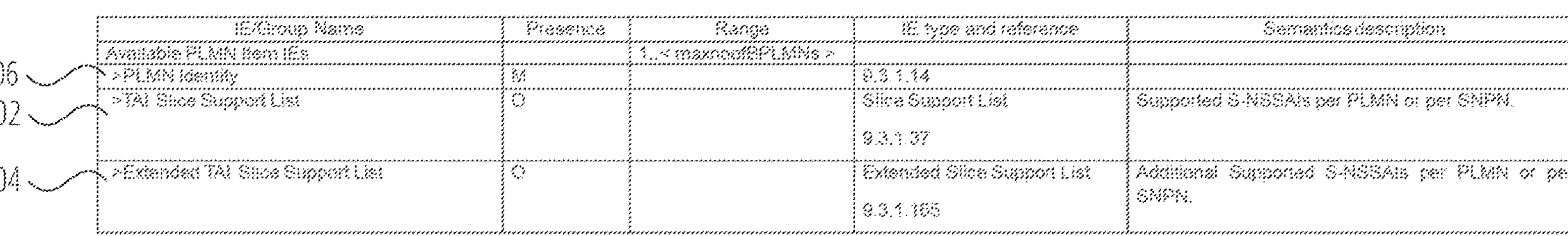

| IE/Group Name | Presence | Range | IE type and reference | Semantics description |
|---|---|---|---|---|
| Available PLMN Item IEs | | 1..< maxnoofBPLMNs > | | |
| >PLMN Identity | M | | 9.3.1.14 | |
| >TAI Slice Support List | O | | Slice Support List 9.3.1.37 | Supported S-NSSAIs per PLMN or per SNPN. |
| >Extended TAI Slice Support List | O | | Extended Slice Support List 9.3.1.165 | Additional Supported S-NSSAIs per PLMN or per SNPN. |

| IE/Group Name | Presence | Range | IE type and reference | Semantics description |
|---|---|---|---|---|
| Extended Available PLMN Item IEs | | 1..< maxnoofExtendedBPLMNs > | | |
| >PLMN Identity | M | | 9.3.1.14 | |
| >TAI Slice Support List | O | | Slice Support List 9.3.1.37 | Supported S-NSSAIs per PLMN or per SNPN. |
| >Extended TAI Slice Support List | O | | Extended Slice Support List 9.3.1.165 | Additional Supported S-NSSAIs per PLMN or per SNPN. |

| F1 Setup Request/gNB-DU Configuration Update | | Available PLMN at CU | |
|---|---|---|---|
| PLMN 1 | S-NSSAI 1 | PLMN 1 | S-NSSAI 1 |
| | S-NSSAI 2 | | S-NSSAI 2 |
| PLMN 2 | S-NSSAI 1 | PLMN 3 | S-NSSAI 1 |
| | S-NSSAI 2 | | S-NSSAI 2 |

| F1 Setup Request/gNB-DU Configuration Update | | Available PLMN at CU | |
|---|---|---|---|
| PLMN 1 | S-NSSAI 1 | PLMN 1 | S-NSSAI 1 |
| | S-NSSAI 2 | | S-NSSAI 2 |
| PLMN 2 | S-NSSAI 1 | PLMN 2 | S-NSSAI 1 |
| | S-NSSAI 2 | | S-NSSAI 3 |

| F1 Setup Request/gNB-DU Configuration Update | | Available PLMN at CU | |
|---|---|---|---|
| PLMN 1 | S-NSSAI 1 | PLMN 1 | S-NSSAI 1 |
| | S-NSSAI 2 | | S-NSSAI 2 |
| PLMN 2 | S-NSSAI 1 | PLMN 2 | S-NSSAI 1 |
| | S-NSSAI 2 | | |

| F1 Setup Request/gNB-DU Configuration Update | | Available PLMN at CU | |
|---|---|---|---|
| PLMN 1 | S-NSSAI 1 | PLMN 1 | S-NSSAI 1 |
| | S-NSSAI 2 | | S-NSSAI 2 |
| PLMN 2 | S-NSSAI 1 | PLMN 2 | S-NSSAI 7 |
| | S-NSSAI 2 | | S-NSSAI 8 |

FIG. 7

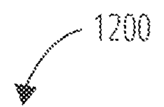

RECEIVE A FIRST MESSAGE FROM THE GNB-DU OVER THE F1 INTERFACE, IN WHICH THE FIRST MESSAGE IS AN F1 SETUP REQUEST OR AN GNB-DU CONFIGURATION UPDATE, AND THE FIRST MESSAGE INDICATING A FIRST PLMN SET PROVISIONED AT THE GNB-DU WITH EACH PLMN OF THE FIRST PLMN SET HAVING A FIRST ASSOCIATED S-NSSAI SET 1202

COMPARE THE FIRST PLMN SET WITH A SECOND PLMN SET PROVISIONED AT THE GNB-CU, EACH PLMN OF THE SECOND PLMN SET HAVING A SECOND ASSOCIATED S-NSSAI SET, TO DETERMINE MATCHING NETWORK SLICE INFORMATION FOR ANY COMMON PLMNS AMONG THE FIRST AND SECOND PLMN SETS 1204

TRIGGER A SECOND MESSAGE FOR THE GNB-DU, IN WHICH THE SECOND MESSAGE IS AN F1 SETUP RESPONSE OR AN GNB-DU CONFIGURATION UPDATE ACKNOWLEDGE, AND IN WHICH THE SECOND MESSAGE INDICATES THE MATCHING NETWORK SLICE INFORMATION FOR THE COMMON PLMNS AMONG THE FIRST AND SECOND PLMN SETS 1206

FIG. 12

GENERATE A FIRST MESSAGE FOR THE GNB-CU, IN WHICH THE FIRST MESSAGE IS AN F1 SETUP REQUEST OR AN GNB-DU CONFIGURATION UPDATE, AND THE FIRST MESSAGE INDICATING A FIRST PLMN SET PROVISIONED AT THE GNB-DU WITH EACH PLMN OF THE FIRST PLMN SET HAVING A FIRST ASSOCIATED S-NSSAI SET, THE FIRST MESSAGE CAUSING THE GNB-CU TO COMPARE THE FIRST PLMN SET WITH A SECOND PLMN SET PROVISIONED AT THE GNB-CU, EACH PLMN OF THE SECOND PLMN SET HAVING A SECOND ASSOCIATED S-NSSAI SET, SO AS TO DETERMINE MATCHING NETWORK SLICE INFORMATION FOR ANY COMMON PLMNS AMONG THE FIRST AND SECOND PLMN SETS 1302

IN RESPONSE TO THE FIRST MESSAGE, RECEIVE A SECOND MESSAGE FROM THE GNB-CU, IN WHICH THE SECOND MESSAGE IS AN F1 SETUP RESPONSE OR AN GNB-DU CONFIGURATION UPDATE ACKNOWLEDGE, AND IN WHICH THE SECOND MESSAGE INDICATES MATCHING NETWORK SLICE INFORMATION FOR THE COMMON PLMNS AMONG THE FIRST AND SECOND PLMN SETS 1304

STORE THE MATCHING NETWORK SLICE INFORMATION FOR COORDINATION OF UE-SUPPORTED NETWORK SLICING INFORMATION WITH THE MATCHING NETWORK SLICE INFORMATION 1306

FIG. 13

NETWORK SLICING COORDINATION OVER NEXT GENERATION RADIO ACCESS NETWORKS

TECHNICAL FIELD

This application relates generally to coordination of network slicing between a next generation radio access network (NG-RAN) distributed unit (DU) and a central unit (CU), and more specifically to coordination of network slicing via F1 application protocol (F1AP), NG application protocol (NGAP), and radio resource control (RRC) signaling.

BACKGROUND INFORMATION

Wireless mobile communication technology uses various standards and protocols to transmit data between a base station and a wireless mobile device. Wireless communication system standards and protocols may include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi®.

In 3GPP radio access networks (RANs) in LTE systems, the base station may include a RAN node such as an Evolved Universal Terrestrial Radio Access Network (E-UTRAN) Node B (also commonly denoted as evolved Node B, enhanced Node B, eNodeB, or eNB), which communicates with a wireless communication device, known as user equipment (UE). In fifth generation (5G) wireless RANs, RAN Nodes may include a 5G-NR node (also referred to as a next-generation Node B or gNodeB (gNB)).

RANs use a radio access technology (RAT) to communicate between the RAN node and UE. RANs may include global system for mobile communications (GSM), enhanced data rates for GSM evolution (EDGE) RAN (GERAN), Universal Terrestrial Radio Access Network (UTRAN), E-UTRAN, and/or NG-RAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT. As used herein, the term "NG-RAN node" (or simply NG-RAN) may refer to a RAN node that operates in an NR or 5G system and the term "E-UTRAN node" or the like may refer to a RAN node that operates in an LTE or 4G system (e.g., an eNB).

An NG-RAN includes a radio unit (RU), a distributed unit (DU), and a central unit (CU), which in some embodiments may be implemented in a gNB (i.e., gNB-RU, gNB-DU, and gNB-CU). In general, the RU is the part of the network that is physically closest to the end user and is responsible for the radio transmission and reception. The RU is typically located on a tower or other high structure. The gNB-DU is the part of the network that is responsible for processing and forwarding data between the RU and the gNB-CU. The gNB-DU may be located either near the gNB-RU or centrally. The gNB-CU is the part of the network that is responsible for the control plane (CP) functions, such as managing the network and allocating resources. The gNB-CU is typically located in a central location, such as a data center. The gNB-CU has a user plane (UP) function that handles forwarding of UP traffic in between gNB-DU and 5G CN.

In other embodiments, an NG-RAN may be implemented in an Open Radio Access Network (O-RAN). O-RAN is a disaggregated approach to deploying mobile fronthaul and midhaul networks built on cloud native principles. O-RAN is an evolution of the NG-RAN architecture, first introduced by the GSMA's 3GPP in its release 15 (5G version 1) technical specification TS 38.401. The O-RAN Alliance formed to undertake the advancement of NG-RAN philosophies, expanding on the scope of what was originally outlined by the 3GPP. An O-RAN includes an O-RAN RU (O-RU), an O-RAN DU (O-DU), and an O-RAN CU (O-CU).

The latest 5G cellular networking standards support new use cases such as enhanced mobile broadband (eMBB), ultra-reliable low latency communications (URLLC), massive machine type communications (mMTC), cellular vehicle to anything (CV2X) communications and several others that will benefit the revolution into the next decade. Different industry verticals will leverage 5G O-RAN enabled connectivity and its benefits in different ways. Mobile network operators will seek to deliver unique service-level agreements (SLAs) to their customers based on specific use cases and their end-to-end emerging cloud native network infrastructure deployments while supporting interworking with other legacy and emerging access technologies.

Network slicing is a 3GPP standards-defined feature capability that allows logical partitioning of a 5G mobile networking infrastructure within RAN and core domains into virtual networks that can meet the unique service level demands of a variety of industry verticals that could benefit from high-speed mobile connectivity. With the disaggregation of networking functions as well as their associated applications within the RAN and core domains, operators can benefit in terms of software solutions in a multi-vendor eco-system rather than being locked into a traditional single-vendor monolithic networking equipment. Such multi-vendor solutions, however, bring in new service delivery continuity challenges as the need for extensive testing arises to ensure inter-operability of the signaling interfaces as well as applications associated with the networking functions. The complexity of signaling interactions grows exponentially within RAN, core, and between RAN-core domains, when designing networks with advanced slicing capabilities.

The Single-Network Slice Selection Assistance Information (S-NSSAI) associated with the subscription profile of an end user or device sits in the subscription database system within the core network and is used by the network to detect a particular network slice instance (NSI). The S-NSSAI includes a slice service type (SST) that signifies how a network slice behaves based on its specific service (e.g., eMBB, URLLC, mMTC, CV2X) and an optional slice differentiator (SD) that differentiates between multiple network slices of the same slice/service type.

SUMMARY OF THE DISCLOSURE

Although network slicing capabilities have been enhanced in releases of 3GPP standards since their introduction in Release 15, there exist technical gaps with respect to the coordination of S-NSSAI information during signaling exchanges within RAN and across RAN-core domains. Due to the slicing feature capabilities being considered by global carriers for innovative 5G services delivery, the accurate exchange and monitoring of S-NSSAI information during mobility/handover events is useful. Lack of 3GPP standards maturity for network slicing-related information exchange and coordination during signaling events/procedures within 5G networks results in inefficient network design and operations. Such inefficiencies lead to unnecessary signaling overheads that can be very taxing for limited RAN network resources.

This disclosure addresses these technical gaps by enhancing the signaling procedures with slicing information exchange so that there is a tighter coordination and control of the use of specific slices during complex mobility events. This will also enable the RAN control, management, and orchestration layer to effectively monitor and use such slicing information exchanged between the network functions to intelligently steer traffic while ensuring seamless service continuity and enhanced end user quality of experience. Accordingly, this disclosure describes an intelligent means of exchanging slicing information within 5G radio access networks.

In some embodiments, the coordination and efficient exchange of signaling with network slicing information is enhanced when users connect to the 5G network. This ensures 5G network functions within the disaggregated RAN domain (e.g., F1AP signaling between gNB-DU and gNB-CU interface) as well as RAN and core network exchanges (NGAP/N2 interface) drive optimal signaling efficiencies independent of the deployment models considered. The disclosed embodiments facilitate effective call processing and avoid unnecessary signaling overhead at the air interface level between the 5G-RAN and UE including the mobility/handover scenarios in between 5G-RAN nodes.

The disclosed techniques facilitate building intelligent protocol software stack solutions for the traditional as well as virtualized/cloud-native RAN networking products, which service providers can in turn leverage in building smart RAN solutions.

The disclosed techniques facilitate intelligent monitoring of RANs and the network slicing performance with enhanced data analytics within the 5G networking domain.

Software-defined slicing exchange and monitoring provides differentiated RAN solutions that can be integrated with any 5G core network vendor equipment to drive enhanced slicing services.

Additional aspects and advantages will be apparent from the following detailed description of embodiments, which proceeds with reference to the accompanying drawings.

BRIEF DESCRIPTION OF THE DRAWING FIGURES

To easily identify the discussion of any particular element or act, the most significant digit or digits in a reference number refer to the figure number in which that element is first introduced.

FIG. 2 is a table showing information elements (IEs) for an Available PLMN List in accordance with one embodiment.

FIG. 3 is a table showing information elements for an Extended Available PLMN List in accordance with one embodiment.

FIG. 4 is a table showing a first example scenario for communicating slice information in connection with F1 setup or gNB-DU configuration.

FIG. 5 is a table showing a second example scenario for communicating slice information in connection with F1 setup or gNB-DU configuration.

FIG. 6 is a table showing a third example scenario for communicating slice information in connection with F1 setup or gNB-DU configuration.

FIG. 7 is a table showing a fourth example scenario for communicating slice information in connection with F1 setup or gNB-DU configuration.

Figure 8A:
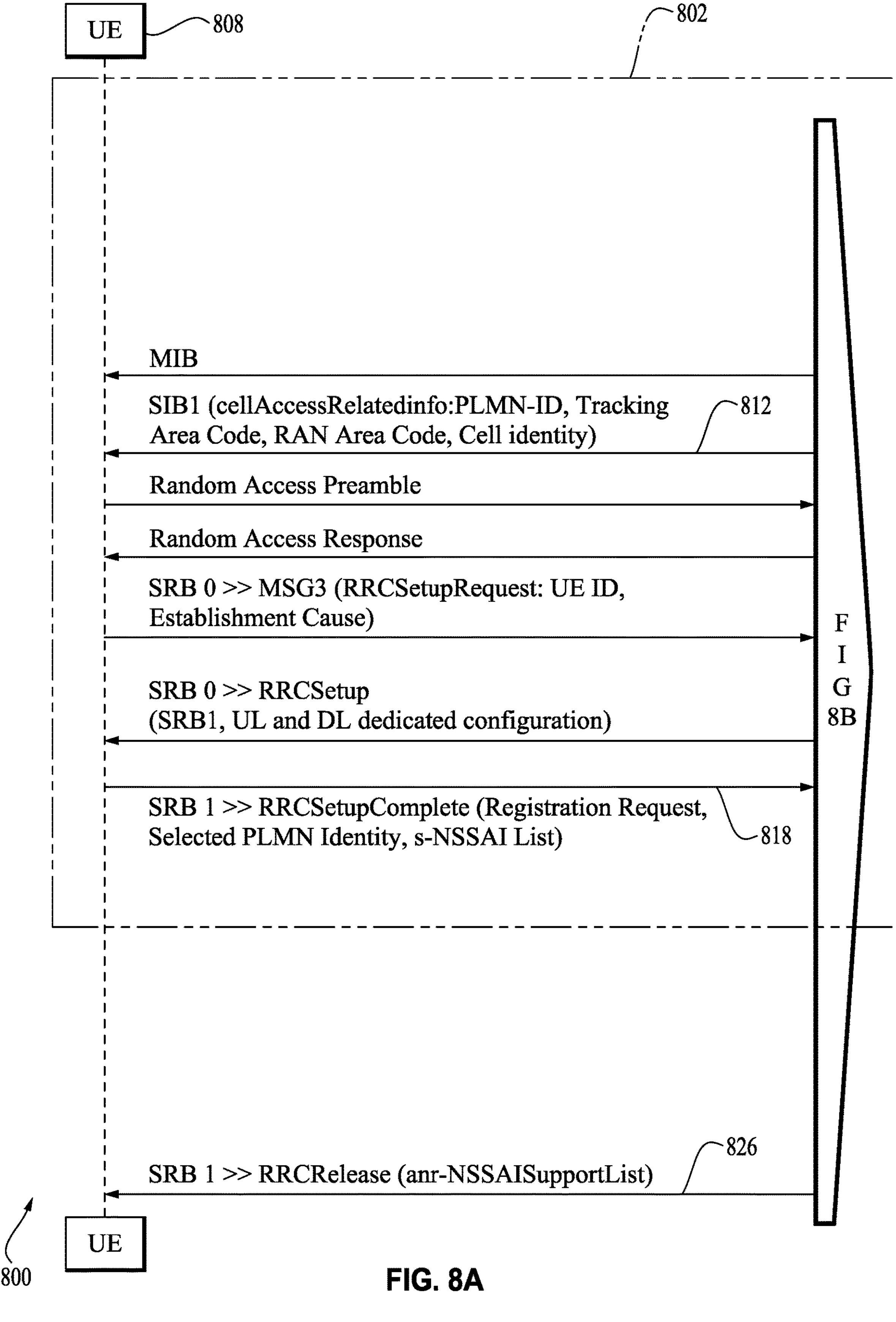
Figure 8B:
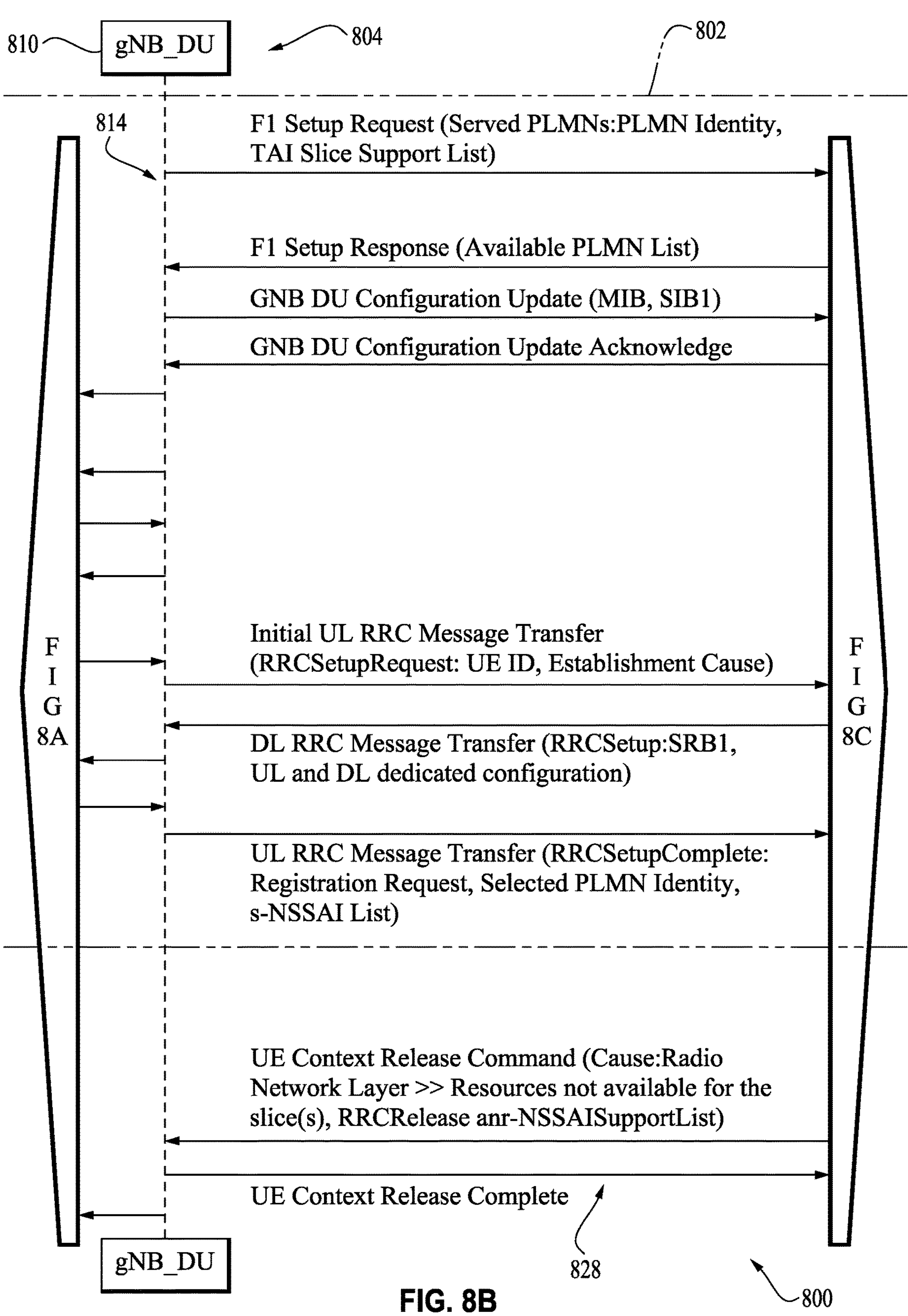
Figure 8C:
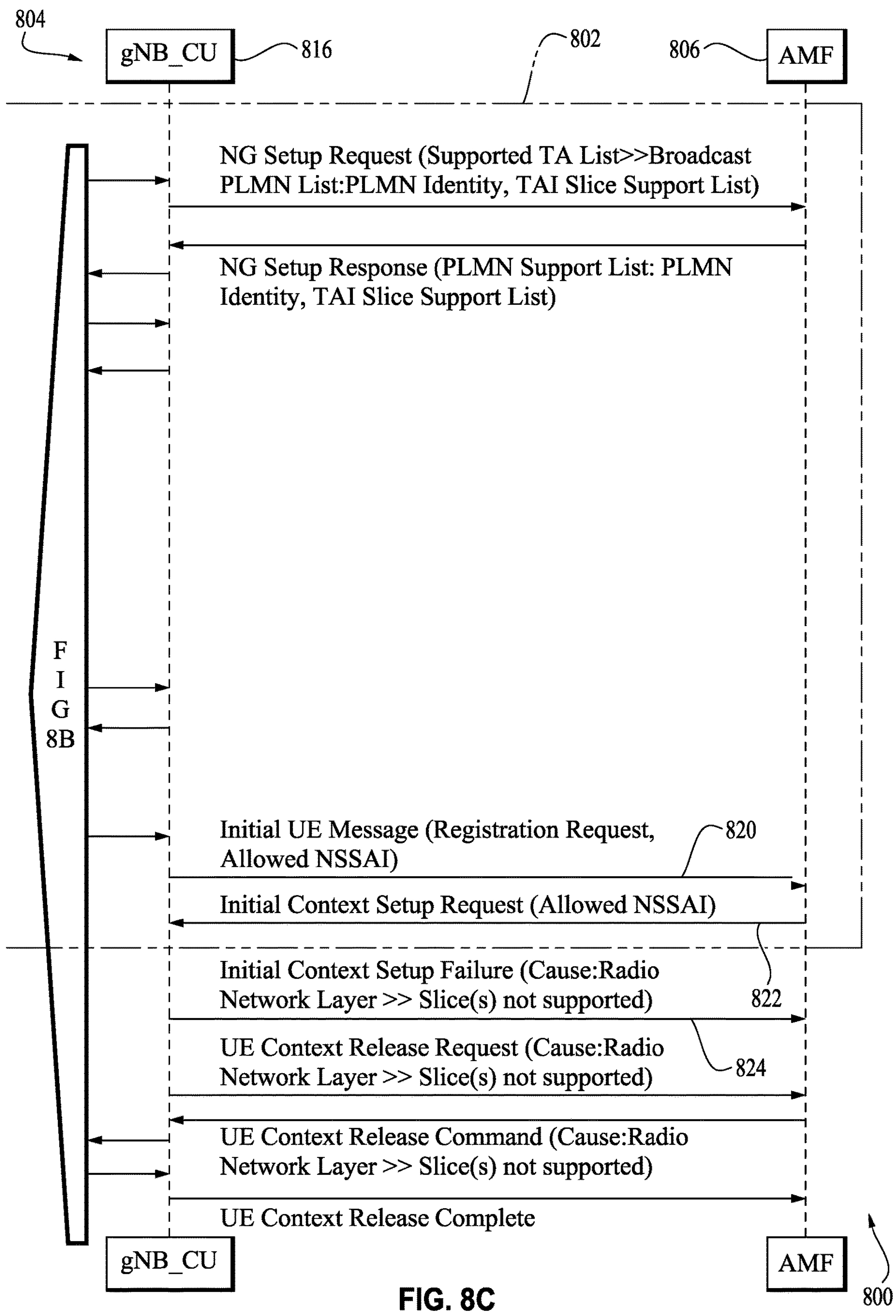

FIGS. 8A, 8B, and 8C (collectively, FIG. 8) are a message sequence diagram in accordance with one embodiment.

Figure 9A:
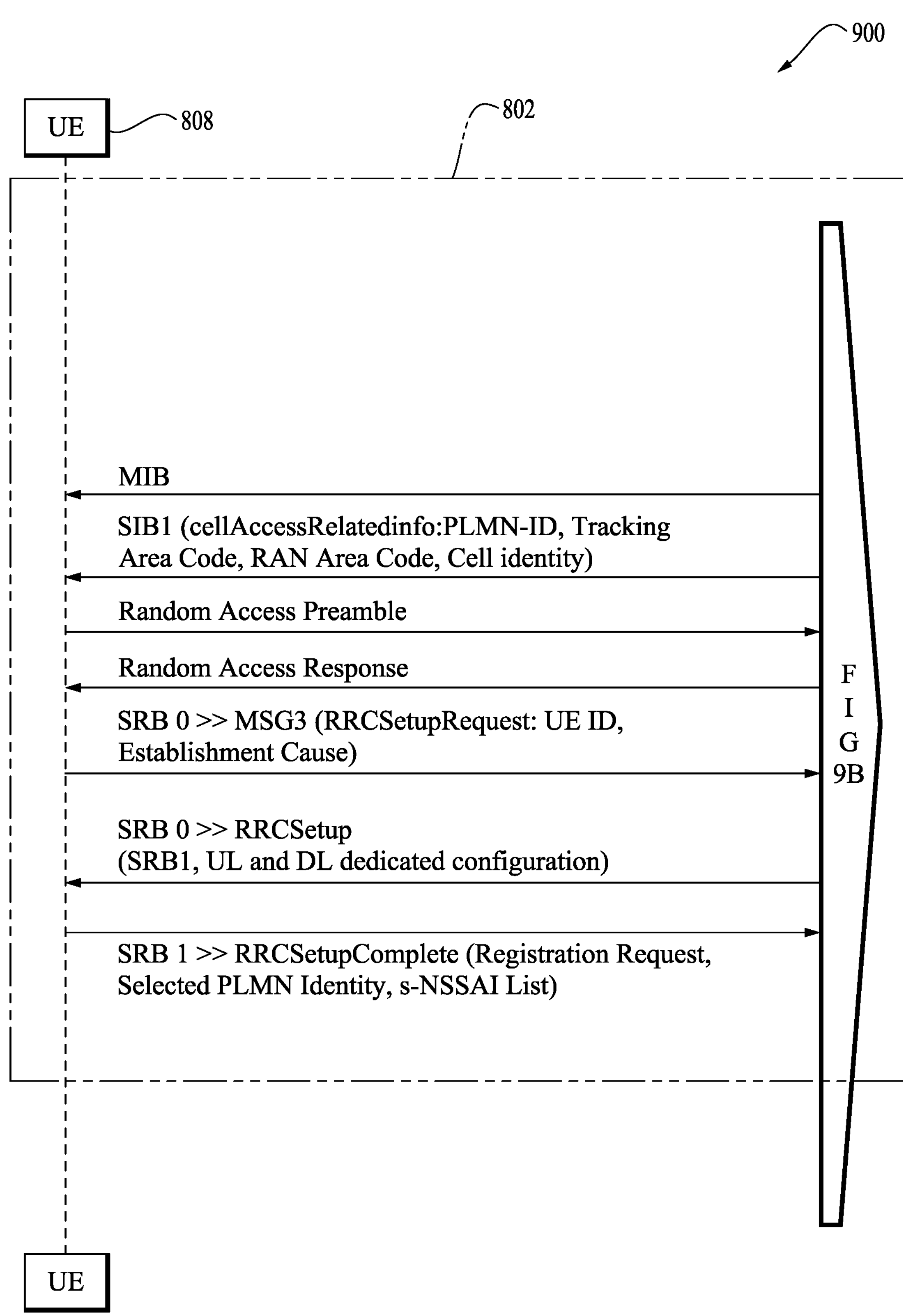
Figure 9B:
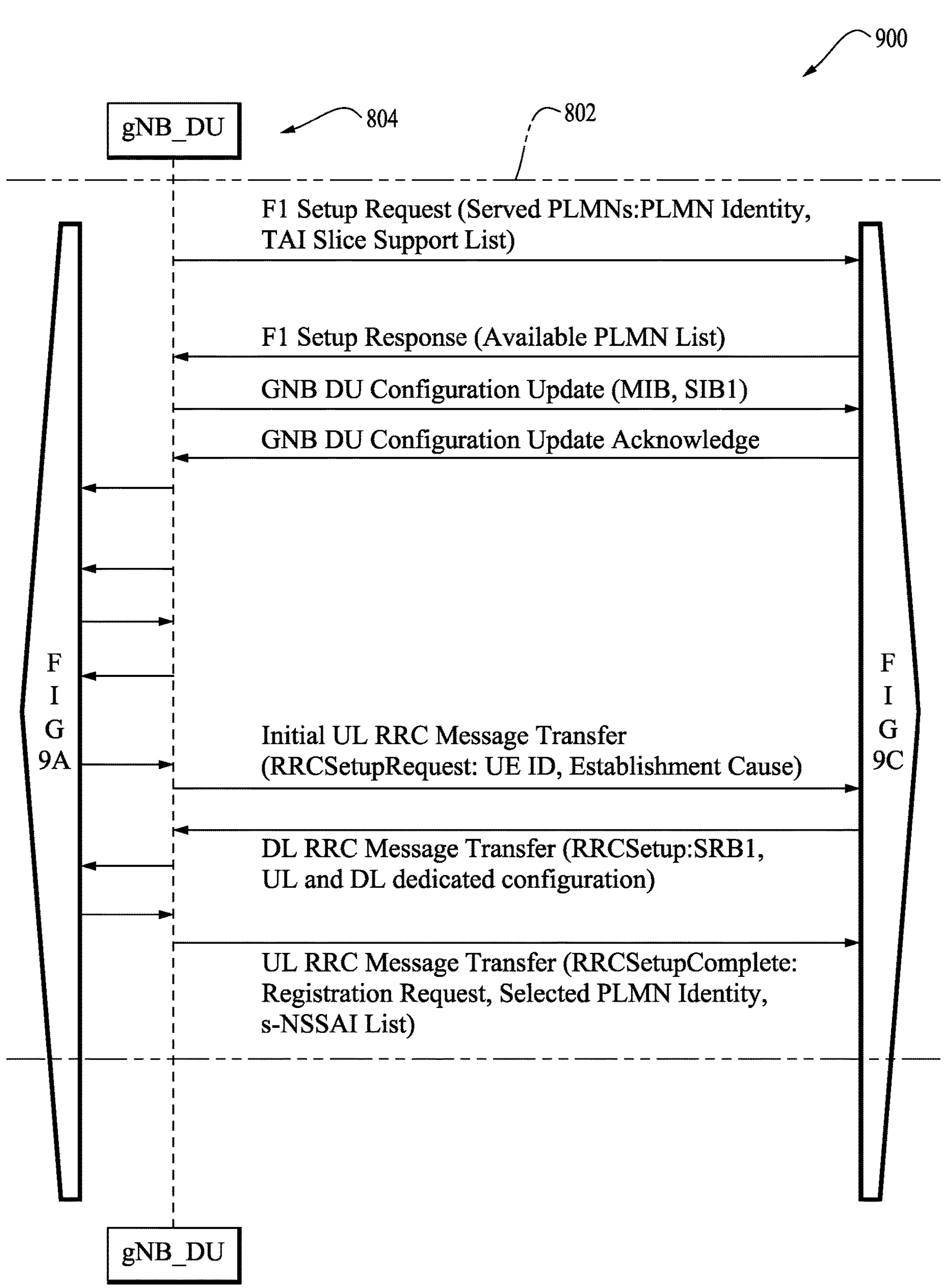
Figure 9C:
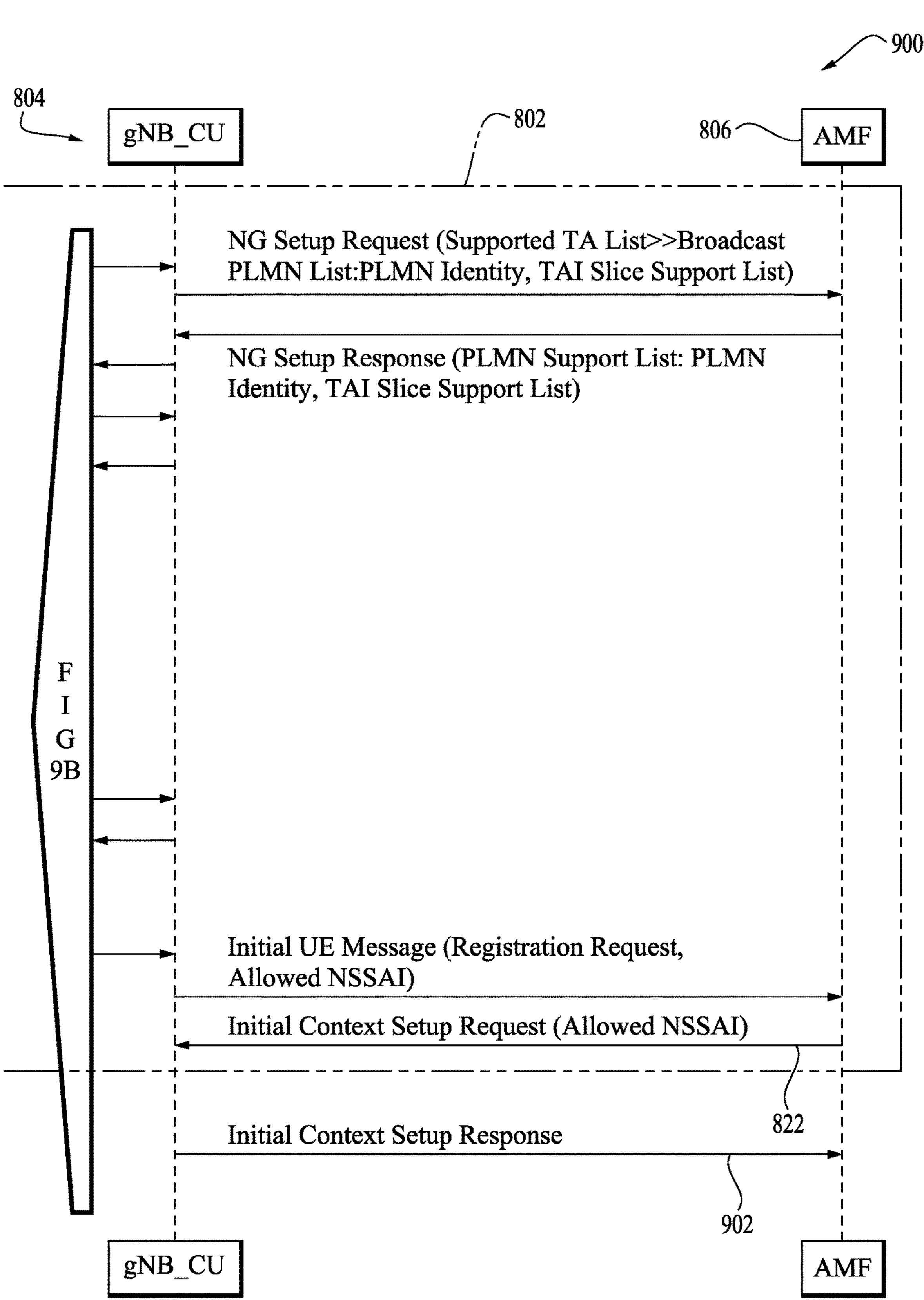

FIGS. 9A, 9B, and 9C (collectively, FIG. 9) are a message sequence diagram in accordance with one embodiment.

Figure 10:
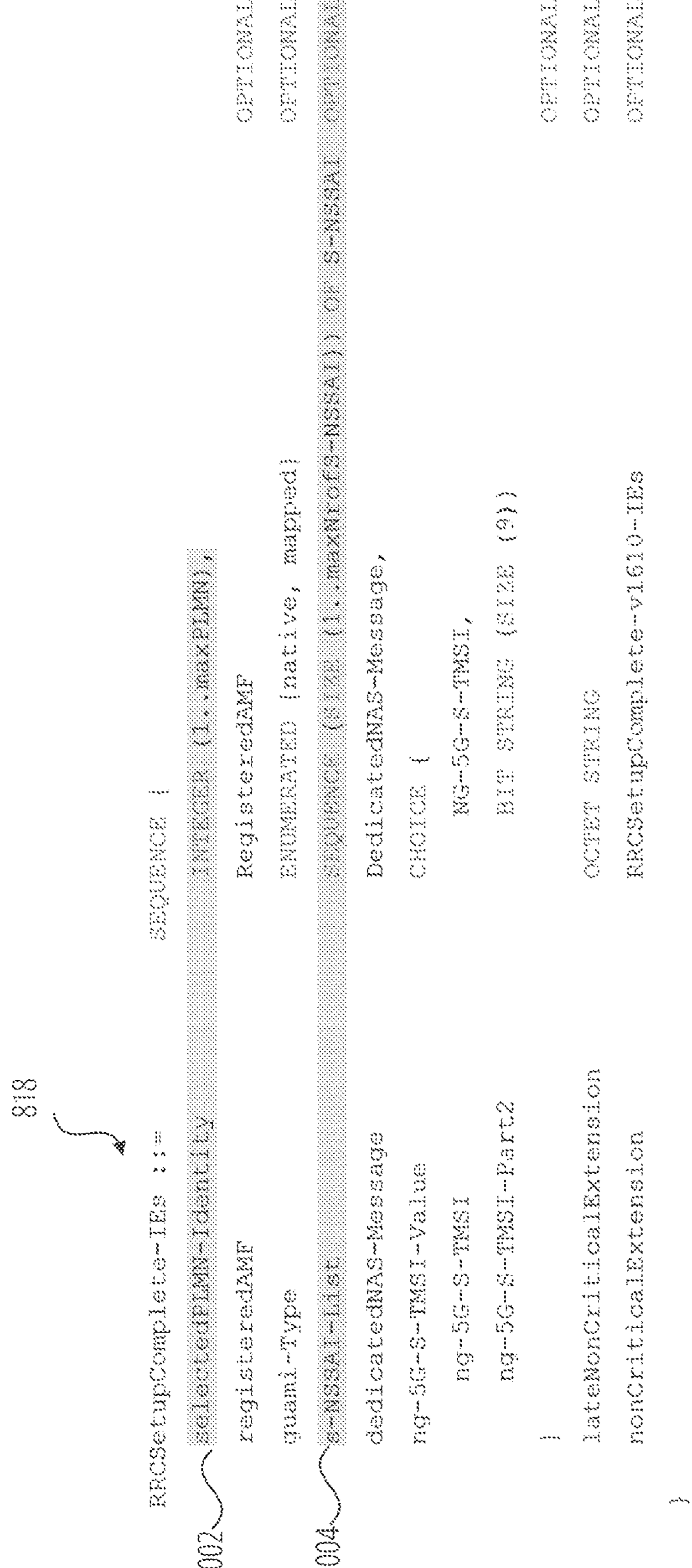

FIG. 10 is an excerpt of an abstract syntax notation (ASN) for a radio resource control (RRC) setup complete message as defined in 3GPP TS 38.331 in accordance with one embodiment.

Figure 11:
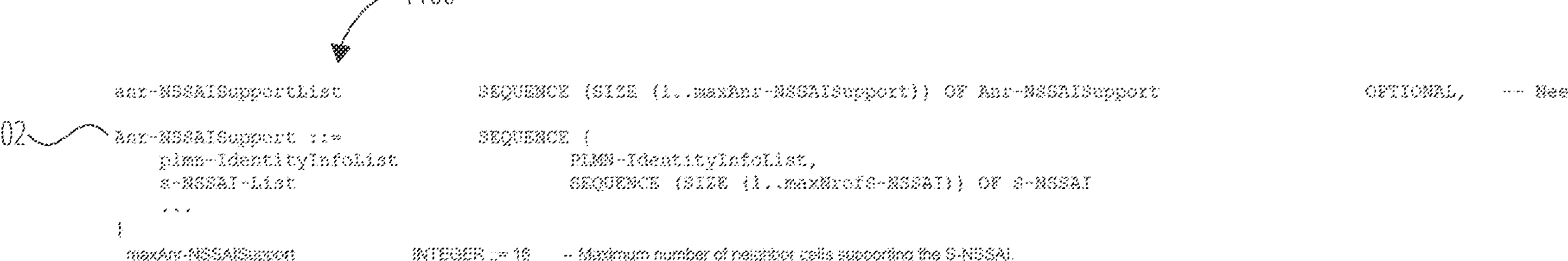

FIG. 11 is an excerpt of an abstract syntax notation (ASN) for anr-NSSAISupportList information element (IE) in accordance with one embodiment.

FIG. 12 illustrates a process 1200 for coordinating network slice information over an F1 interface with a gNB-DU in accordance with one embodiment.

FIG. 13 illustrates a process 1300 for coordinating network slice information over an F1 interface with a gNB-CU in accordance with one embodiment.

Figure 14:
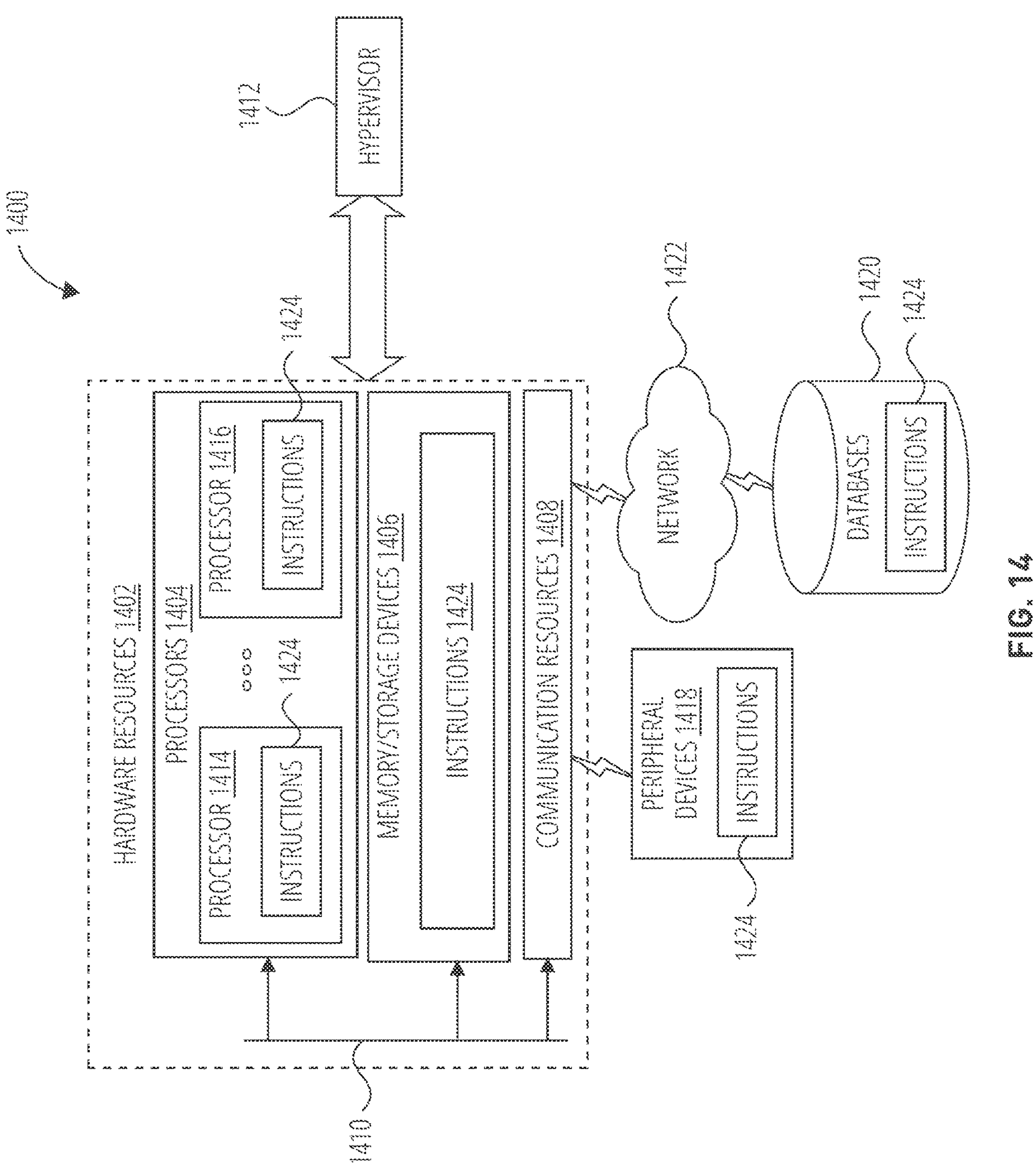

FIG. 14 is a block diagram of computing components for performing the disclosed procedures, in accordance with one embodiment.

DETAILED DESCRIPTION OF EMBODIMENTS

Figure 1:
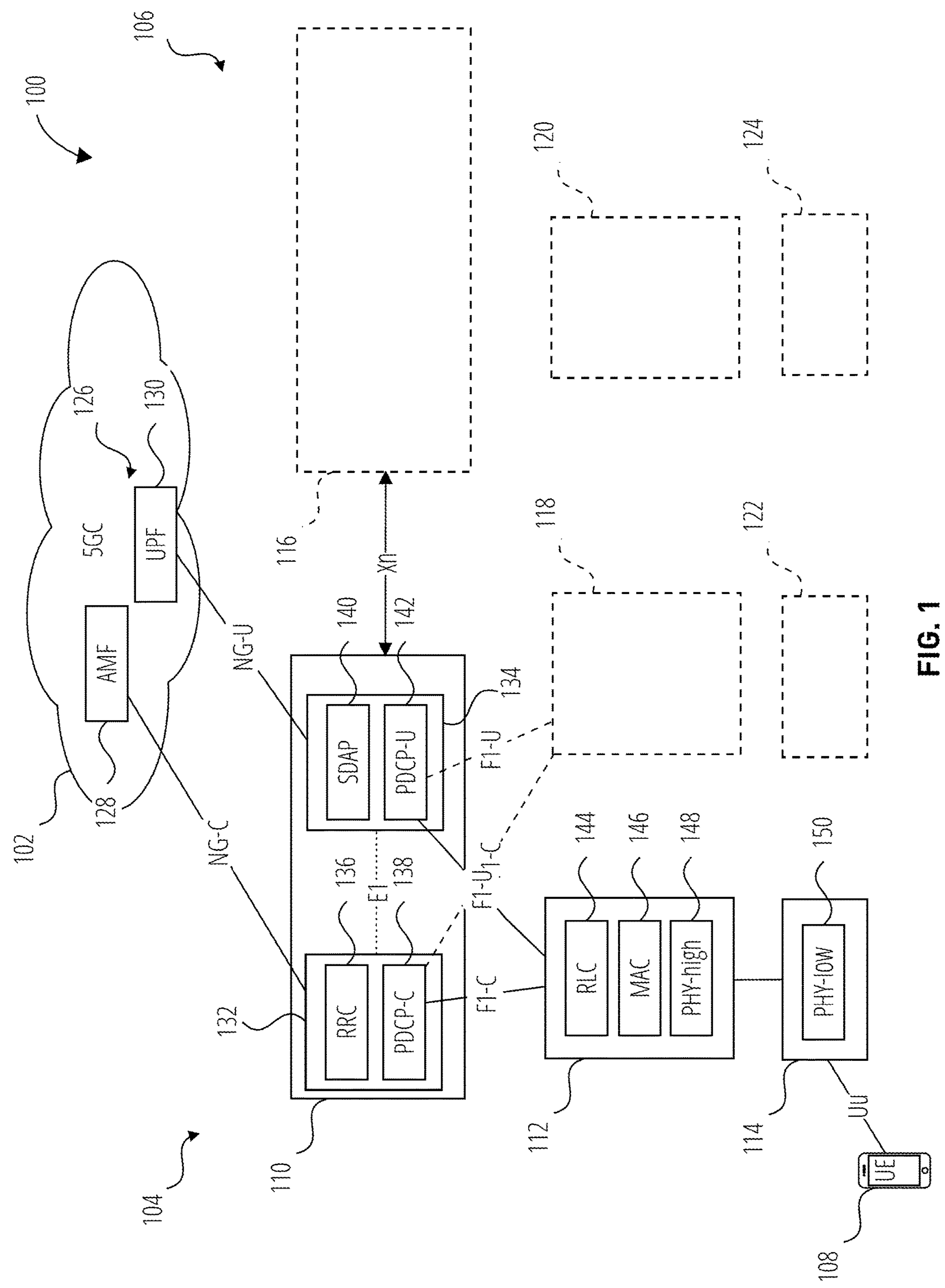
FIG. 1 is a block diagram of a cellular communication network in accordance with one embodiment.

FIG. 1 shows a cellular communication network 100 that operates in conjunction with the 5G or NR system standards as provided by 3GPP technical specifications. Cellular communication network 100 includes a 5G core network (5GC) 102, a first gNB 104, a second gNB 106, and a UE 108. In this example, each gNB includes a gNB-CU, a gNB-DU, and a gNB-RU. For instance, first gNB 104 includes a gNB-CU 110, a gNB-DU 112, and a gNB-RU 114. For conciseness, features of one gNB-CU, gNB-DU, and gNB-RU are shown in FIG. 1, and skilled persons should appreciate that these features may be implemented for the following components shown in broken lines: gNB-CU 116, gNB-DU 118 and gNB-DU 120, and gNB-RU 122 and gNB-RU 124. In some other examples, a gNB-DU may include an integrated gNB-RU.

5GC 102 includes network elements 126 configured to offer various data and telecommunications services to customers/subscribers (e.g., users of UE 108) connected to 5GC 102 via a RAN, such as first gNB 104. For instance, as described in 3GPP TS 23.501, 5GC 102 includes an access and mobility management function (AMF) 128, a user plane function (UPF) 130. Other components that are not shown include the following: a session management function (SMF), an authentication server function (AUSF), a network exposure function (NEF), a unified data management (UDM), a unified data repository (UDR), a short message service function (SMSF), a non-3GPP interworking function (N3IWF), a policy control function (PCF), an NF repository function (NRF), a network slice selection function (NSSF), an application function (AF), a charging function (CHF), an operations support system and a business support system (OSS/BSS), and other 5G core network functions.

The components of 5GC 102 may be implemented in one physical node or distributed across separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of 5GC 102 may be referred to as a network slice, and a logical instantiation of a portion of 5GC 102 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more 5GC components/functions.

As shown for gNB-CU 110, each gNB-CU includes a control plane (CP) and a user plane (UP). For instance, gNB-CU 110 includes a CU-CP 132 and a CU-UP 134. CU-CP 132 includes RRC 136 and PDCP-C 138 layers. CU-CP 132 communicate with an AMF 128 in 5GC 102 via an NG-C interface (also called an N2 interface). CU-UP 134 includes SDAP 140 and PDCP-U 142 layers. An E1 interface provides for communications between CU-CP 132 and CU-UP 134.

RANs connected with 5GC 102 via an NG interface. For instance, as shown in FIG. 1, the NG interface is split into the following two parts: an NG user plane (NG-U) interface, which carries traffic data between CU-UP 134 and UPF 130, and an NG control plane (NG-C) interface, which is a signaling interface between CU-CP 132 and AMF 128.

An Xn (control and user planes) interface provides for communications among first gNB 104 and second gNB 106. The Xn interface is defined between two or more RAN nodes (e.g., two or more gNBs and the like). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface, and mobility support for UE 108 in a connected mode, including functionality to manage the UE mobility for connected mode between one or more RAN nodes. The mobility support may include context transfer from an old (source) serving RAN node to a new (target) serving RAN node, and control of user plane tunnels between old (source) serving RAN node to new (target) serving RAN node. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be the same or similar to the user plane and/or control plane protocol stack(s) shown and described herein.

A RAN node may be formed from gNB-DUs that are connected to a gNB-CU via individual F1 interfaces. As shown in FIG. 1, gNB-DU 112 includes RLC 144, MAC 146, and PHY-high 148 layers. Also, gNB-DU 112 communicate with CU-CP 132 via an F1-C interface; and it communicates with CU-UP 134 via an F1-U interface.

In some implementations, the gNB-DUs may include one or more remote radio heads or RFEMs, and the gNB-CU may be operated by a server that is located in the RAN (not shown) or by a server pool. Additionally, or alternatively, a RAN node may be next-generation eNBs (ng-eNBs), which are RAN nodes that provide E-UTRA user plane and control plane protocol terminations toward UE 108, and are connected to 5GC 102 via the NG interface.

To provide radio access, gNB-RU 114 includes a PHY-low 150 layer. Accordingly, gNB-RU 114 communicates with UE 108 via an air Uu interface.

UE 108 is illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, UE 108 may be an IoT UE, which may comprise a network access layer designed for low-power IoT applications utilizing short-lived UE connections. An IoT UE may utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the internet infrastructure), with short-lived connections. The IoT UEs may execute background applications (e.g., keep-alive messages, status updates, etc.) to facilitate the connections of the IoT network.

With reference to FIG. 2-FIG. 7, 3GPP TS 38.473 (see, e.g., version 17.1.0) specifies the 5G radio network layer signaling protocol for the F1 interface. As indicated with reference to FIG. 1, the F1 interface provides the means for interconnecting a gNB-CU and a gNB-DU of a gNB within an NG-RAN, or for interconnecting a gNB-CU and a gNB-DU of an en-gNB within an E-UTRAN. The F1 application protocol (F1AP) supports the functions of the F1 interface by signaling procedures defined in TS 38.473. For instance, the F1AP provides for coordination between gNB-CU and gNB-DU network functions within NG-RAN over F1 interface signaling for PLMN IDs. Specifically, based on the 3GPP specification (and as reproduced in the following table), configured PLMN IDs and associated S-NSSAIs are sent from the gNB-DU to the gNB-CU in an F1 setup request/gNB-DU configuration update message over the F1-C interface during cell bring up.

| IE/Group Name | Semantics Description |
|---|---|
| Served PLMNs | Broadcast PLMNs in SIB 1 associated with the NR Cell Identity in the NR CGI IE |
| >PLMN Identity | |
| >TAI Slice Support List | Supported S-NSSAIs per TA |
| >NPN Support Information | Supported NPNs per PLMN |
| >Extended TAI Slice Support List | Additional Supported S-NSSAIs per TA |

Moreover, PLMN IDs and associated S-NSSAIs are sent from the gNB-CU to the AMF in an NG setup request message over the NG-C interface when brining up a RAN node. Details of an NG setup request and response are provided in 3GPP TS 38.413.

| IE/Group Name | Semantics Description |
|---|---|
| Supported TA List | Supported TAs in the NG-RAN node |
| >Supported TA Item | |
| >>TAC | Broadcast TAC |
| >>Broadcast PLMN List | |
| >>>Broadcast PLMN Item | |
| >>>>PLMN Identity | Broadcast PLMN |
| >>>>TAI Slice Support List (contains S-NSSAIs) | Supported S-NSSAIs for the per TAC per PLMN or per SNPN |

Similarly, there is the following provision to send supported PLMN IDs and associated S-NSSAIs in the NG setup response message from the AMF to the gNB-CU over the NG-C interface.

| IE/Group Name | Semantics Description |
|---|---|
| PLMN Support List | |
| >PLMN Support Item | |
| >>PLMN Identity | Broadcast TAC |
| >>Slice Support List (contains S-NSSAIs) | Supported SNSSAIs per PLMN |

Over the NG-C interface, both the gNB-CU and the AMF exchange their supported PLMNs and associated S-NSSAIs in connection with an NG setup procedure. Over the F1-C interface, the gNB-DU shares its supported PLMNs and associated S-NSSAIs in an F1 setup request/gNB-DU configuration update message. But in the F1 setup response/gNB-DU configuration update acknowledge message, the gNB-CU includes an IE "Available PLMN List," which is an optional IE having PLMN Identity and not any S-NSSAI. The inclusion of the IE "Available PLMN List," is based on the following passage set forth in section 8.2.3.2 of TS 38.473. "For NG-RAN, the gNB-CU may include Available PLMN List IE, and optionally also Extended Available PLMN List IE in the F1 SETUP RESPONSE message, if the available PLMN(s) are different from what gNB-DU has provided in F1 SETUP REQUEST message, gNB-DU shall take this into account and only broadcast the PLMN(s) included in the received Available PLMN list(s)."

Though each PLMN ID provided in an F1 setup request is associated with one or multiple S-NSSAI(s), the present inventors recognized that there can be situations in which the available PLMNs are the same as those that the gNB-DU has provided in F1 setup request/gNB-DU configuration update message, but the S-NSSAI(s) associated with the available PLMNs are different from what the gNB-DU has provided in the F1 setup request/gNB-DU configuration update message. There has been no provision to make such a coordination over the F1-C interface between the gNB-CU and the gNB-DU with a difference in S-NSSAI(s) associated to an available PLMN. In other words, the present inventors have recognized that the previous coordination at the PLMN level does not take into account the PLMN-specific network slicing aspects between the gNB-CU and the gNB-DU over F1AP. Lack of this capability in the standards inhibits service providers from designing intelligent networks with advanced network slicing capabilities when supporting multiple PLMNs or when roaming between carrier networks with multiple PLMNs. Accordingly, this disclosure describes enhancements to the F1AP implementations for S-NSSAI coordination at the PLMN level between the gNB-CU and the gNB-DU when bringing up a gNB or new cell through an F1 setup procedure or an gNB-DU configuration update procedure. Such enhancements include consideration of the initial setup as well as failure conditions to be handled between the gNB-CU and the gNB-DU in a more robust manner.

As shown in FIG. 2 and FIG. 3, in an F1 setup response/gNB-DU configuration update acknowledge message, an Available PLMN List IE 200 (FIG. 2) and Extended PLMN List IE 300 (FIG. 3) can be updated to include optional TAI Slice Support List 202 and Extended TAI Slice Support List 204, in addition to existing PLMN Identity 206. Available PLMN List IE 200 contains up to six PLMN ID entries. Extended PLMN List IE 300 is used when there are entries for more than six and up to 12 PLMN IDs to be indicated. More generally, skilled persons will appreciate that other extended lists are also optional. Note that references to signaling of Available PLMN List IE 200 may optionally also include Extended PLMN List IE 300.

TAI Slice Support List 202, according to 3GPP TS 38.473 section 9.3.1.37, has an associated maxnoofSliceItems IE that represents maximum number of signaled slice support items. That value is 1,024. Likewise, Extended TAI Slice Support List 204, according to 3GPP TS 38.473 section 9.3.1.165, has an associated maxnoofExtSliceItems IE that represents the maximum number of signaled slice support items. That value is 65,535.

To support coordination in connection with the F1 setup process, the previous process defined in section 8.2.3.2 of 3GPP TS 38.473 is also modified as follows. In some embodiments, the gNB-CU includes the additional information TAI Slice Support List 202 and Extended TAI Slice Support List 204 in the F1 setup response message in response to determining that the available slice(s) associated to an available PLMN are different from what the gNB-DU has provided in its F1 setup request message. Accordingly, the gNB-DU would take this into account and only broadcast the PLMN(s) included in the received Available PLMN List(s). This inclusion of TAI Slice Support List 202 and optionally Extended TAI Slice Support List 204 strengthens the coordination between the gNB-CU and the gNB-DU through the F1 setup procedure so as to ensure the available PLMNs and S-NSSAIs are aligned at gNB level.

The present inventors also recognized that another issues arises in the context of the gNB-DU configuration update process when a new cell is brought up on a gNB-DU. Specifically, the following passage is described in section 8.2.4.2 of 3GPP TS 38.473 (version 17.1.0): "If Available PLMN List IE, and optionally also Extended Available PLMN List IE, is contained in GNB-DU CONFIGURATION UPDATE ACKNOWLEDGE message, the gNB-DU shall overwrite the whole available PLMN list and update the corresponding system information." In a situation where a new cell is brought up on the gNB-DU, where the gNB-DU has already brought up other cell(s) and the gNB-DU shares its supported PLMNs and associated S-NSSAIs for the newly configured cell in gNB-DU configuration update, there is no such condition available for inclusion of IE "Available PLMN List."

To support coordination in connection with the gNB-DU configuration update process for a situation where a new cell is brought up on the gNB-DU, the previous process defined in section 8.2.4.2 of 3GPP TS 38.473 is also modified as follows. In some embodiments, the gNB-CU includes the additional information TAI Slice Support List 202 and Extended TAI Slice Support List 204 in GNB-DU CONFIGURATION UPDATE ACKNOWLEDGE message in response to determining that the available PLMN(s) are different and/or the available slice(s) associated with an available PLMN are different from what gNB-DU has provided in GNB-DU CONFIGURATION UPDATE message. Thus, TAI Slice Support List 202 and Extended TAI Slice Support List 204 are included in Available PLMN Item IEs when the available slice(s) associated with an available PLMN are different. When one or both of these lists 202 and 204 are provided, the gNB-DU shall overwrite the whole Available PLMN List and update the corresponding system information. This inclusion of TAI Slice Support List 202 and optionally Extended TAI Slice Support List 204 strengthens the coordination between the gNB-CU and the gNB-DU through the gNB-DU configuration update procedure to ensure the available PLMN and S-NSSAIs are aligned at the gNB level.

FIG. 4-FIG. 7 each show a table and collectively represent four different example scenarios in which the previously described coordination is employed. For each example scenario, the previous process is described and contrasted with the enhanced processes that are the subject of this disclosure.

FIG. 4 shows a first example scenario 400 in which PLMN 1 and slice configurations are the same at the gNB-DU and the gNB-CU, but the gNB-DU has a PLMN 2 configuration whereas the gNB-CU has a PLMN 3 configuration. Under the previous process, the Available PLMN List in the F1 setup response/gNB-DU configuration update acknowledge message is provided for PLMN 1. This is so because PLMN 2 and PLMN 3 are not matching. Thus, PLMN 2 and 3 are not considered in the previous process.

Under the disclosed process, there would be no impact for F1 setup procedure. The PLMN 1 would be communicated based on the present definition of Available PLMN List IE 200 (FIG. 2) in an F1 setup response message. Likewise, Available PLMN List IE 200 in the gNB-DU configuration update acknowledge message would also include PLMN 1 and not include the non-matching PLMN 2 and PLMN 3. Accordingly, PLMNs 2 and 3 are not considered. In other words, because of the mismatch, the gNB-DU need not consider PLMNs 2 and 3 as serving PLMN further, since neither of them is supported in one or both of the gNB-DU or the gNB-CU. Here, PLMN 1 will be included as Available PLMN without any TAI slice support list/extended TAI slice support list, because no slice under PLMN 1 is mismatching.

FIG. 5 shows a second example scenario 500 in which PLMN 1 and slice configurations are the same at the gNB-DU and the gNB-CU, but the gNB-DU has a PLMN 2 configuration with S-NSSAIs 1 and 2 whereas the gNB-CU has a PLMN 2 configuration with S-NSSAIs 1 and 3. In this situation, consideration of the S-NSSAI lists under a PLMN was not previously standardized. Thus, the F1 setup response/gNB-DU configuration update acknowledge message may be provided without including the Available PLMN List IE since both PLMN IDs are matching, notwithstanding the fact that the S-NSSAIs 2 and 3 slice configurations under PLMN 2 are actually not matching. Nevertheless, because there is no mismatch in the PLMN IDs, both PLMN 1 and 2 may be considered as the Available PLMNs at both the gNB-CU and gNB-DU, in which case the Available PLMN List may not be included in the F1 setup response/gNB-DU configuration update acknowledge message. As per previous specifications, it is up to the implementation whether one may include this PLMN 2 or not as the available PLMN. If PLMN 2 will be considered, then the F1 setup response/gNB-DU configuration update acknowledge message will not contain any Available PLMN List IE, which means both PLMNs are considered to be available.

Under the disclosed process, however, Available PLMN List IE 200 in F1 setup response/gNB-DU configuration update acknowledge message includes PLMN 1 (with no TAI Slice Support List 202, as there is no difference in slices) and PLMN 2 (with TAI Slice Support List 202 for S-NSSAI 1).

FIG. 6 shows a third example scenario 600 in which PLMN 1 and slice configurations are the same at the gNB-DU and the gNB-CU, but the gNB-DU has a PLMN 2 configuration with S-NSSAIs 1 and 2 whereas the gNB-CU has a PLMN 2 configuration with S-NSSAI 1. As explained above with respect to second example scenario 500, consideration of the S-NSSAI lists under a PLMN was not previously standardized. Thus, the F1 setup response/gNB-DU configuration update acknowledge message may be provided without including the Available PLMN List IE since both PLMN IDs are matching, notwithstanding the fact that the PLMN 2 under the gNB-CU lacks the S-NSSAI 2 slice configuration that is under the gNB-DU. Nevertheless, because there is no mismatch in the PLMN IDs, both PLMN 1 and 2 may be considered as the Available PLMNs at both the gNB-CU and gNB-DU, in which case the Available PLMN List may not be included in the F1 setup response/gNB-DU configuration update acknowledge message.

Under the disclosed process, however, Available PLMN List IE 200 in the F1 setup response/gNB-DU configuration update acknowledge message includes PLMN 1 (with no TAI Slice Support List 202, as there is no difference in slices) and PLMN 2 (with TAI Slice Support List 202 for S-NSSAI 1).

FIG. 7 shows a fourth example scenario 700 in which PLMN 1 and slice configurations are the same at the gNB-DU and the gNB-CU, but the gNB-DU has a PLMN 2 configuration with S-NSSAIs 1 and 2 whereas the gNB-CU has a PLMN 2 configuration with S-NSSAIs 7 and 8. As explained above with respect to second example scenario 500 and third example scenario 600, consideration of the S-NSSAI lists under a PLMN was not previously standardized. Thus, the F1 setup response/gNB-DU configuration update acknowledge message may be provided without including the Available PLMN List IE since both PLMN IDs are matching, notwithstanding the fact that none of the S-NSSAIs match under PLMN 2. Nevertheless, because there is no mismatch in the PLMN IDs, both PLMN 1 and 2 may be considered as the Available PLMNs at both the gNB-CU and gNB-DU, in which case the Available PLMN List may not be included in the F1 setup response/gNB-DU configuration update acknowledge message.

Under the disclosed process, however, Available PLMN List IE 200 in the F1 setup response/gNB-DU configuration update acknowledge message includes PLMN 1 (with no TAI Slice Support List 202, as there is no difference in slices). PLMN 1 is added mandatorily without adding PLMN 2, as no slice under PLMN 2 is matching.

FIG. 8 and FIG. 9 show, respectively, a message sequence 800 for coordinating slice mismatching and a message sequence 900 for slice matching. Notably, however, each sequence 800 and 900 shares a common portion 802 (within a dotted rectangle) for the signaling exchanged between a gNB 804, AMF 806, and a UE 808.

With reference to common portion 802, a SIB1 is prepared by a gNB-DU 810 for broadcast 812 over the air (Uu) interface for UEs. The SIB1 may be included in an F1 setup request/gNB-DU configuration update 814 over F1-C towards a gNB-CU 816. The SIB1 includes an IE "cellAccessRelatedInfo" with plmn-Identity InfoList containing PLMN-ID, tracking area code, RAN area code, cell identity, and the like. UE 808 would perform cell selection based on PLMN ID and cellSelectionInfo broadcasted in SIB1 and initiate RRC connection to that selected cell. To complete a successful RRC connection, UE 808 sends an RRC setup complete message 818 with IEs (shown in FIG. 10) including a selectedPLMN-Identity 1002. SelectedPLMN-Identity 1002 is mandatory and that PLMN ID index refers to a PLMN ID broadcast 812 in SIB1. It is the index of the PLMN ID index that belongs to PLMN Identity List in PLMN identity info list in cell access related info of SIB1.

In addition to this information, UE 808 may send an S-NSSAI-List 1004 (FIG. 10) optionally to gNB-DU 810 in RRC setup complete message 818. But in a SIB1, there is no provision to broadcast the available S-NSSAI(s) from gNB 804. Previously, an RRC setup complete message would include S-NSSAI-List 1004 based on the S-NSSAI(s) information provided to the RRC of a UE by its upper layer only. Thus, there was no coordination provided from a gNB to a UE for sharing available S-NSSAI(s) at the gNB. This lack of coordination prevents the UE's RRC from preparing a consolidated S-NSSAI-List 1004 by taking into account both by its upper layer and the gNB-provided S-NSSAI information. So, in a case where the UE includes S-NSSAI-List 1004 in an RRC setup complete message, and any of the S-NSSAI(s) included in S-NSSAI-List 1004 do not match with any of the available S-NSSAI(s) at the gNB, there was a chance of UE release further due to unavailability of S-NSSAI at the gNB.

The present inventors, however, have developed the following process to be performed for coordinating slicing information between gNB 804, UE 808, and AMF 806. Initially, in one embodiment when UE-supported S-NSSAI is available, UE 808 sends S-NSSAI-List 1004 to gNB 804 in RRC setup complete message 818. S-NSSAI-List 1004 is based on UE-supported S-NSSAI.

Next, gNB-CU 816 sends an initial UE message 820 (an NGAP message) to AMF 806. Initial UE message 820 (IE: AllowedNSSAI) is an optional IE as per the 3GPP TS 38.413. As it is optional, whether to included it previously depended on a vendor-specific implementation. In this disclosure, however, it is used it with gNB-CU 816 to inform AMF 806 about the supported slices for enhanced coordination. Message 820 includes an AllowedNSSAI IE, which is populated with slicing information based on the following cases. Case A is when S-NSSAI-List 1004 is present in RRC setup complete message 818, as noted above. Accordingly, gNB 804 considers S-NSSAI-List 1004 to fill the AllowedNSSAI IE in initial UE message 820. Case B is when S-NSSAI-List 1004 is not present in RRC setup complete message 818. Thus, gNB 804 considers its local S-NSSAI (i.e., the slicing information coordinated between gNB-DU 810 and gNB-CU 816, described previously) to construct AllowedNSSAI IE in initial UE message 820.

In response to initial UE message 820, AMF 806 sends an initial context setup request message 822 to gNB 804 following the NAS level authentication, security, and identity procedures. Initial context setup request message 822 includes an AllowedNSSAI IE. In other words, irrespective of what list is sent from gNB 804, AMF 806 will include its own supported S-NSSAI(s) in the AllowedNSSAI IE in initial context setup request message 822.

Next, gNB-CU 816 takes one of three different actions as described as follows with reference to FIG. 8 (two slice mismatch actions) and FIG. 9 (slice match action).

A first type of mismatch occurs when gNB 804 lacks support for slices identified by an AMF 806. A second type of mismatch occurs when gNB 804 lacks support for slices optionally identified by a UE 808. These cases are each explained as follows.

According to a first action (type 1), if the local slicing information of gNB 804 does not match any of the S-NSSAI(s) listed in the AllowedNSSAI IE of initial context setup request message 822 from AMF 806, then gNB 804 triggers an initial context setup failure message 824 with the cause indicating the slice(s) are not supported and an RRC release message 826 (with optional IE anr-NSSAISupportList 1100, explained later with reference to FIG. 11) for UE 808 along with an F1AP and NGAP UE context release procedure 828 as specified in FIG. 8.

According to a second action (type 2), if the local slicing information of gNB 804 matches any of the S-NSSAI(s) listed in the AllowedNSSAI IE of initial context setup request message 822, it will make a consolidated list of those common S-NSSAI(s). But in this example, gNB 804 does not support any of the S-NSSAI(s) listed in S-NSSAI-List 1004 (if present) in RRC setup complete message 818 with respect to the prepared consolidated list, so gNB 804 triggers initial context setup failure message 824 with the cause indicating the slice(s) are not supported and RRC release message 826 (with optional IE anr-NSSAISupportList 1100) for UE 808 along with F1AP and NGAP UE context release procedure 828.

FIG. 9 shows message sequence 900 occurring for slice matching. In this type of scenario, if gNB 804 supports any of the S-NSSAI(s) listed in the AllowedNSSAI IE of initial context setup request message 822 and also listed in S-NSSAI-List 1004 (if present) in RRC setup complete message 818, then gNB 804 triggers an initial context setup response message 902 and further UE registration procedure is performed.

As indicated above, 3GPP TS 38.331 (RRC specification) has a provision for a UE to inform the selected S-NSSAI to the network in RRC setup complete message 818, whereas a specific way of handling for slice mismatch between UE and network has been unspecified. Accordingly, this disclosure describes that triggering the graceful RRC release message 826 after slice mismatch (see, e.g., FIG. 8) has been detected from initial context setup request message 822.

In addition to triggering graceful RRC release message 826, FIG. 11 shows how inclusion of IE, anr-NSSAISupportList 1100 in RRC release message 826 would further assist UE 808 to select a cell supporting the S-NSSAI provisioned at UE 808, and thereby avoid delay for successful registration procedure of that UE 808 with the network using the supported S-NSSAI.

FIG. 11 shows the proposed ASN structure for anr-NSSAISupportList 1100 to be inserted as an extension of RRC release message 826 in a future 3GPP release of 3GPP TS 38.331. The following parameters are to be included in each anr-NSSAISupport 1102 item of the new IE anr-NSSAISupportList 1100: 1. NR-CGI; 2. 5G-TAC; 3. RAC; 4. PLMN-ID; and 5. S-NSSAI list. For instance, anr-NS-SAISupportList 1100 indicates those cell details for just the cells that are present in the neighbor list (either static neighbor or dynamic neighbor or both) of gNB 804. Those neighbors must support a minimum of one of the S-NSSAI(s) which is/are listed in the S-NSSAI-List 1004 (if present) in RRC setup complete message 818. Inclusion of this optional IE is configurable for implementations at the NG-RAN side.

FIG. 12 shows a process 1200, performed by a gNB-CU, for coordinating network slice information over an F1 interface with a gNB-DU. In block 1202, process 1200 receives a first message from the gNB-DU over the F1 interface, in which the first message is an F1 setup request or an gNB-DU configuration update, and the first message indicating a first PLMN set provisioned at the gNB-DU with each PLMN of the first PLMN set having a first associated S-NSSAI set. In block 1204, process 1200 compares the first PLMN set with a second PLMN set provisioned at the gNB-CU, each PLMN of the second PLMN set having a second associated S-NSSAI set, to determine matching network slice information for any common PLMNs among the first and second PLMN sets. In block 1206, process 1200 triggers a second message for the gNB-DU, in which the second message is an F1 setup response or an gNB-DU configuration update acknowledge message, and in which the second message indicates the matching network slice information for the common PLMNs among the first and second PLMN sets.

Process 1200 may also include, in response to all network slice information matching for a common PLMN, the second message omitting a TAI slice support list associated with the common PLMN.

Process 1200 may also include, in response to a subset of network slice information differing for a common PLMN, the second message including a TAI slice support list indicating matching network slice information for the common PLMN.

Process 1200 may also include the first message being the F1 setup request and the second message being the F1 setup response.

Process 1200 may also include the first message being the gNB-DU configuration update and the second message being the gNB-DU configuration update acknowledge.

Process 1200 may also include omitting from the second message any common PLMNs lacking at least one matching S-NSSAI.

Process 1200 may also include receiving a third message from the gNB-DU, in which the third message is a UL RRC message transfer indicating an S-NSSAI list generated in response to a UE indicating whether it has UE-supported network slicing information, and triggering a fourth message for an initial registration of the UE with an AMF, the fourth message including allowed NSSAI information that is based on the UE-supported network slicing information.

FIG. 13 shows a process 1300, performed by a gNB-DU, for coordinating network slice information over an F1 interface with a gNB-CU. In block 1302, process 1300 generates a first message for the gNB-CU, in which the first message is an F1 setup request or an gNB-DU configuration update, and the first message indicating a first PLMN set provisioned at the gNB-DU with each PLMN of the first PLMN set having a first associated S-NSSAI set, the first message causing the gNB-CU to compare the first PLMN set with a second PLMN set provisioned at the gNB-CU, each PLMN of the second PLMN set having a second associated S-NSSAI set, so as to determine matching network slice information for any common PLMNs among the first and second PLMN sets. In block 1304, process 1300 in response to the first message, receives a second message from the gNB-CU, in which the second message is an F1 setup response or an gNB-DU configuration update acknowledge, and in which the second message indicates matching network slice information for the common PLMNs among the first and second PLMN sets. In block 1306, process 1300 stores the matching network slice information for coordination of UE-supported network slicing information with the matching network slice information.

Process 1300 may also include receiving a third message from a UE, the third message including the UE-supported network slicing information.

Process 1300 may also include, in response to all network slice information matching for a common PLMN, the second message omitting a TAI slice support list associated with the common PLMN.

Process 1300 may also include, in response to a subset of network slice information differing for a common PLMN, the second message including a TAI slice support list indicating matching network slice information for the common PLMN.

Process 1300 may also include the first message being the F1 setup request and the second message being the F1 setup response.

Process 1300 may also include the first message being the gNB-DU configuration update and the second message being the gNB-DU configuration update acknowledge.

Process 1300 may also include the second message including an extended TAI slice support list to supplement the TAI slice support list.

Process 1300 may also include determining whether the UE-supported network slicing information matches AMF-supported network slice information, and in response to determining there is no match, triggering a UE context release message including an anr-NSSAISupportList, the anr-NSSAISupportList indicating network slicing information for neighboring cells.

Process 1300 may also include determining that the UE-supported network slicing information is unsupported by an AMF and triggering an RRC release message including anr-NSSAISupportList indicating network slice support of neighboring cells.

Process 1300 may also include determining that the UE-supported network slicing information is unsupported by the gNB-DU and triggering an RRC release message including anr-NSSAISupportList indicating network slice support of neighboring cells.

Process 1300 may also include the second message having an extended TAI slice support list to supplement the TAI slice support list.

FIG. 14 is a block diagram illustrating components 1400, according to some example embodiments, configured to read instructions from a machine-readable or computer-readable medium (e.g., a non-transitory machine-readable storage medium) and perform any one or more of the methods or portions thereof discussed herein, such as discussed for the signal flow diagram of FIG. 8 or FIG. 9, process 1200 of FIG. 12, or process 1300 of FIG. 13.

Specifically, FIG. 14 shows a diagrammatic representation of hardware resources 1402 including one or more processors 1404 (or processor cores), one or more memory/ storage devices 1406, and one or more communication resources 1408, each of which may be communicatively coupled via a bus 1410. For embodiments where node virtualization (e.g., NFV) is utilized, a hypervisor 1412 may be executed to provide an execution environment for one or more network slices/sub-slices to utilize hardware resources 1402.

Processors 1404 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio frequency integrated circuit (RFIC), another processor, or any suitable combination thereof) may include, for example, a processor 1414 and a processor 1416.

Memory/storage devices 1406 may include main memory, disk storage, or any suitable combination thereof. Memory/storage devices 1406 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

Communication resources 1408 may include interconnection or network interface components or other suitable devices to communicate with one or more peripheral devices 1418 or one or more databases 1420 via a network 1422. For example, communication resources 1408 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1424 may comprise software, a program, an application, an applet, an app, or other executable code for causing at least one of processors 1404 to perform any one or more of the methods discussed herein. Instructions 1424 may reside, completely or partially, within at least one of processors 1404 (e.g., within the processor's cache memory), memory/storage devices 1406, or any suitable combination thereof. Furthermore, any portion of instructions 1424 may be transferred to hardware resources 1402 from any combination of peripheral devices 1418 or databases 1420. Accordingly, the memory of processors 1404, memory/storage devices 1406, peripheral devices 1418, and databases 1420 are examples of computer-readable and machine-readable media.

In light of this disclosure, skilled persons will appreciate that many changes may be made to the details of the above-described embodiments without departing from the underlying principles of the invention. The scope of the present invention should, therefore, be determined only by claims and equivalents.

What is claimed is:

1. A method, performed by a next generation nodeB (gNB) central unit (CU) (gNB-CU) for coordinating network slice information over an F1 interface with a gNB distributed unit (gNB-DU), the method comprising:

receiving a first message from the gNB-DU over the F1 interface, in which the first message is an F1 setup request or an gNB-DU configuration update, and the first message indicating a first public land mobile network (PLMN) set provisioned at the gNB-DU with each PLMN of the first PLMN set having a first associated single-network slice selection assistance information (S-NSSAI) set;

comparing the first PLMN set with a second PLMN set provisioned at the gNB-CU, each PLMN of the second PLMN set having a second associated S-NSSAI set, to determine matching network slice information for any common PLMNs among the first and second PLMN sets;

in response to all network slice information matching for a common PLMN, the gNB-CU generates a second message which omits a tracking area identity (TAI) slice support list associated with the common PLMN and in response to a subset of network slice information differing for a common PLMN, the gNB-CU generates the second message which includes a tracking area identity (TAI) slice support list indicating matching network slice information for the common PLMN; and transmitting the second message to the gNB-DU, in which the second message is an F1 setup response or an gNB-DU configuration update acknowledge.

2. The method of claim 1, in which the second message includes an extended TAI slice support list to supplement the TAI slice support list.

3. The method of claim 1, in which the first message is the F1 setup request and the second message is the F1 setup response.

4. The method of claim 1, in which the first message is the gNB-DU configuration update and the second message is the gNB-DU configuration update acknowledge.

5. The method of claim 1, further comprising omitting from the second message any common PLMNs lacking at least one matching S-NSSAI.

6. The method of claim 1, further comprising:

receiving a third message from the gNB-DU, in which the third message is an uplink (UL) radio resource control (RRC) message transfer indicating an S-NSSAI list generated in response to a user equipment (UE) indicating whether it has UE-supported network slicing information; and triggering a fourth message for an initial registration of the UE with an access and mobility management function (AMF), the fourth message including allowed NSSAI information that is based on the UE-supported network slicing information.

7. The method of claim 6, further comprising:

determining whether the UE-supported network slicing information matches AMF-supported network slice information; and in response to determining there is no match, triggering a UE context release message including an automatic neighbor relation (anr) NSSAISupportList (anr-NSSAISupportList), the anr-NSSAISupportList indicating network slicing information for neighboring cells.

8. A method, performed by a next generation nodeB (gNB), for coordinating network slice information over an F1 interface between a gNB distributed unit (DU) (gNB-DU) and a gNB central unit (CU) (gNB-CU), the method comprising:

generating, by the gNB-DU, a first message for the gNB-CU, in which the first message is an F1 setup request or an gNB-DU configuration update, and the first message indicating a first public land mobile network (PLMN) set provisioned at the gNB-DU with each PLMN of the first PLMN set having a first associated single-network slice selection assistance information (S-NSSAI) set;

receiving, by the gNB-CU, the first message from the gNB-DU over the F1 interface;

comparing, by the gNB-CU, the first PLMN set with a second PLMN set provisioned at the gNB-CU, each PLMN of the second PLMN set having a second associated S-NSSAI set, so as to determine matching network slice information for any common PLMNs among the first and second PLMN sets;

in response to all network slice information matching for a common PLMN, the gNB-CU generates a second message which omits a tracking area identity (TAI) slice support list associated with the common PLMN and in response to a subset of network slice information differing for a common PLMN, the gNB-CU generates the second message which includes a tracking area identity (TAI) slice support list indicating matching network slice information for the common PLMN;

triggering, by the gNB-CU, the second message for the gNB-DU;

receiving, by the gNB-DU, the second message from the gNB-CU, in which the second message is an F1 setup response or an gNB-DU configuration update acknowledge; and storing, by the gNB-DU, the matching network slice information for coordination of user equipment (UE) supported (UE-supported) network slicing information with the matching network slice information.

9. The method of claim 8, further comprising receiving, by the gNB-DU, a third message from a UE, the third message including the UE-supported network slicing information.

10. The method of claim 9, further comprising determining, by the gNB-DU, that the UE-supported network slicing information is unsupported by an access and mobility management function (AMF) and triggering a radio resource control (RRC) release message including automatic neighbor relation (anr) NSSAISupportList (anr-NSSAISupportList) indicating network slice support of neighboring cells.

11. The method of claim 9, further comprising determining, by the gNB-DU that the UE-supported network slicing information is unsupported by the gNB-DU and triggering an RRC release message including automatic neighbor relation (anr) NSSAISupportList (anr-NSSAISupportList) indicating network slice support of neighboring cells.

12. The method of claim 8, in which the second message includes an extended TAI slice support list to supplement the TAI slice support list.

13. The method of claim 8, in which the first message is the F1 setup request and the second message is the F1 setup response.

14. The method of claim 8, in which the first message is the gNB-DU configuration update and the second message is the gNB-DU configuration update acknowledge.

* * * * *